US00RE39563E

(19) United States
(12) Reissued Patent
Markham

(10) Patent Number: US RE39,563 E
(45) **Date of Reissued Patent: *Apr. 17, 2007**

(54) PET TOY PRODUCT WITH INTEGRAL TREATS RECEIVING RECEPTACLES

(75) Inventor: Joseph P. Markham, Arvada, CO (US)

(73) Assignee: Bounce, Inc., Golden, CO (US)

( * ) Notice: This patent is subject to a terminal disclaimer.

(21) Appl. No.: 10/138,127

(22) Filed: May 1, 2002

Related U.S. Patent Documents

Reissue of:
(64) Patent No.: 6,129,053
Issued: Oct. 10, 2000
Appl. No.: 09/357,277
Filed: Jul. 20, 1999

U.S. Applications:

(63) Continuation of application No. 08/972,549, filed on Nov. 18, 1997, now Pat. No. 5,947,061, which is a continuation-in-part of application No. 08/663,447, filed on Jun. 13, 1996, now abandoned.

(51) Int. Cl.
*A01K 29/00* (2006.01)

(52) U.S. Cl. ..... 119/710
(58) Field of Classification Search ..... 119/51.03, 119/707, 709, 710, 711; 446/122, 153, 220; 434/171; 206/562; 473/413, 570, 593, 594, 473/596, 604, 609, 613, 614; 606/235
See application file for complete search history.

(56) References Cited

U.S. PATENT DOCUMENTS

| | | | | | |
|---|---|---|---|---|---|
| 744,718 | A | * | 11/1903 | Cassidy | 601/131 |
| 848,136 | A | * | 3/1907 | Smith | 119/711 |
| 1,022,113 | A | * | 4/1912 | Smith | 119/711 |
| 1,031,095 | A | * | 7/1912 | Smith | 119/711 |
| 1,149,170 | A | * | 8/1915 | Allis | 119/710 |
| 1,534,964 | A | * | 4/1925 | Kahnweller | 119/711 |
| 2,187,524 | A | * | 1/1940 | Price | 273/348.2 |
| 2,194,736 | A | * | 3/1940 | de Bruler | 272/86 |
| 2,610,851 | A | * | 9/1952 | Jones | 272/8 |
| D188,179 | S | * | 6/1960 | Tay | D12/2 |
| 3,104,648 | A | * | 9/1963 | Fisher | 119/29 |
| 3,251,600 | A | * | 5/1966 | Warnberg | 273/282.1 |

(Continued)

FOREIGN PATENT DOCUMENTS

FR 2633525 A1 * 1/1990

OTHER PUBLICATIONS

Jungle Talk International adverstisement.*
Buster Cube, product packaging, publication date unknown (2 pages).*
"Recipe for the Almost Perfect Dog" brochure and website pages (5 pages total).*

*Primary Examiner*—Robert P. Swiatek
(74) *Attorney, Agent, or Firm*—Sheridan Ross PC

(57) ABSTRACT

A pet toy product for holding one or more animal treats has a body member having an outer surface with one or more recesses for removably holding one or more animal treats. The recesses may be of varying depth so that the treats in the deeper recesses are more difficult for the animal to extract then are the treats in the shallower recesses. The recesses may be circular, triangular, irregular, in the form of a groove or any other suitable configuration. The outer surface of the toy may be raised to accommodate the recesses or the recesses may extend into the surface. The pet toy may have recesses forming openings which extend through the pet toy product for receiving treats. With the structure recited, the pet owner can replenish the treats as often as necessary to maintain the pet's interest in the toy. Different treats can be provided with different nutritional values and tastes. Because some treats will be more difficult for the animal to remove than others, the animal can be kept occupied for several hours before the treats need to be replaced again. The treats may be held in the recesses by friction, adhesive or adhesion.

25 Claims, 3 Drawing Sheets

U.S. PATENT DOCUMENTS 3,664,303 A * 5/1972 Baensch ..... 119/51
3,871,334 A * 3/1975 Axelrod ..... 119/29.5
3,899,607 A * 8/1975 Miller et al. ..... 426/285
4,032,665 A * 6/1977 Miller et al. ..... 426/104
4,513,014 A * 4/1985 Edwards ..... 426/132
4,557,219 A * 12/1985 Edwards ..... 119/29.5
4,802,444 A * 2/1989 Markham et al. ..... 119/29
5,025,753 A * 6/1991 Schneider ..... 119/51.03
RE34,352 E * 8/1993 Markham et al. ..... 119/710
5,343,828 A * 9/1994 Houghton et al. ..... 119/51.03
5,536,007 A * 7/1996 Snyder ..... 273/118
5,553,570 A * 9/1996 VanNatter, III et al. .... 119/709
D387,513 S * 12/1997 Mauldin, Jr. ..... D30/160
D388,559 S * 12/1997 Mauldin, Jr. ..... D30/160
D393,110 S * 3/1998 Mauldin, Jr. ..... D30/160
5,799,616 A * 9/1998 McClung, III ..... 119/709
5,813,366 A * 9/1998 Mauldin, Jr. ..... 119/710
5,924,942 A * 7/1999 Gentile ..... 473/570

* cited by examiner

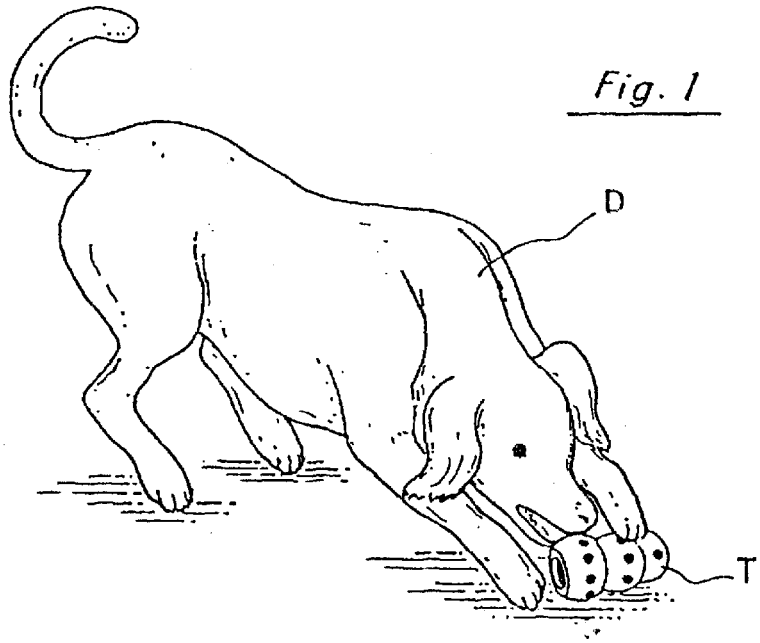
Fig. 1
Fig. 2
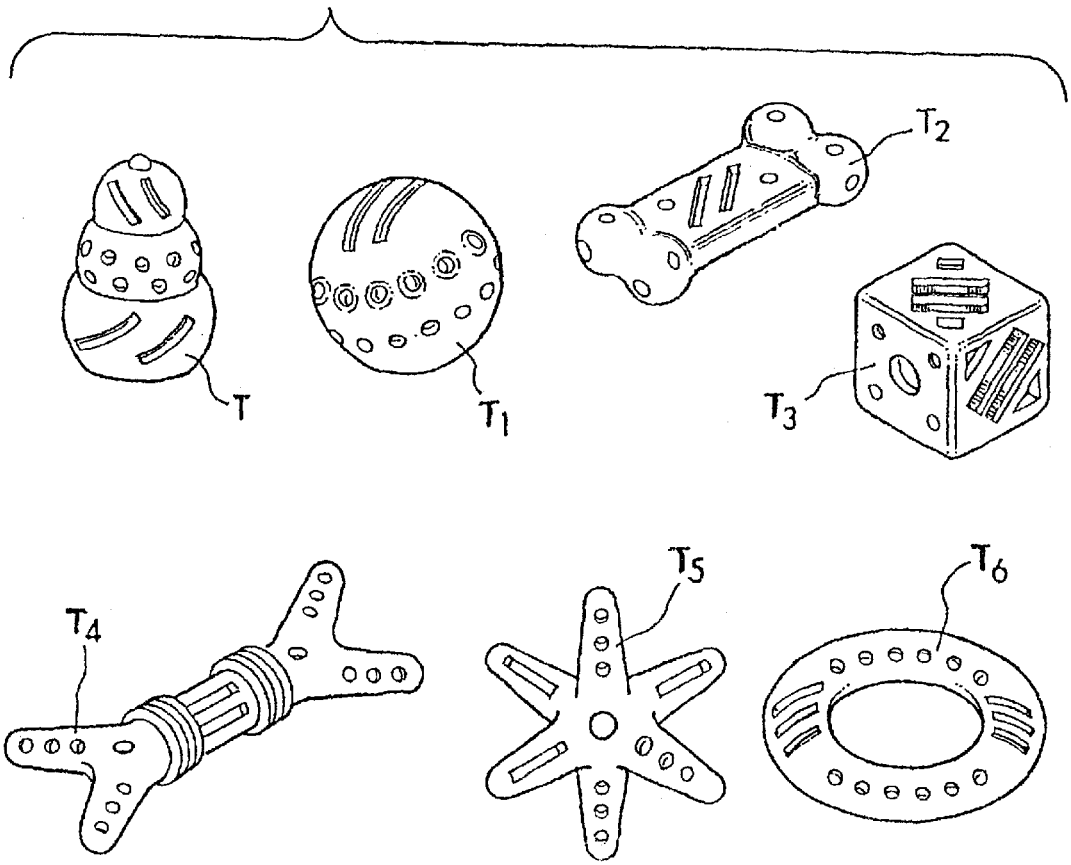

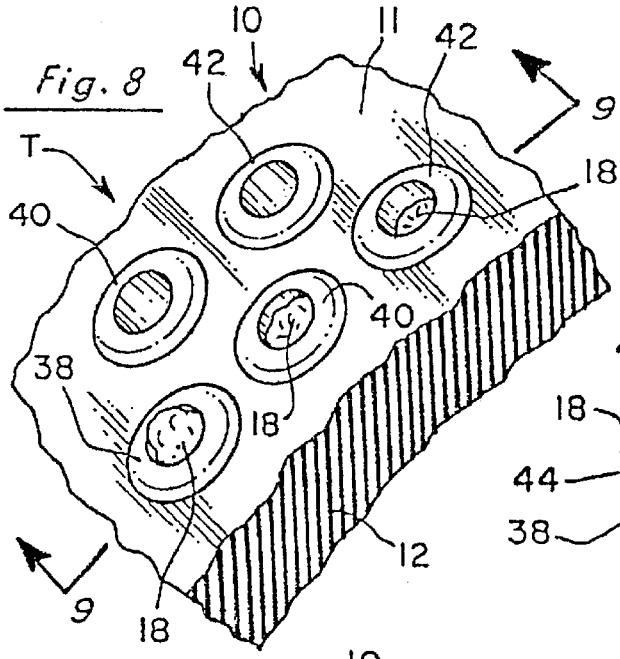
Fig. 8
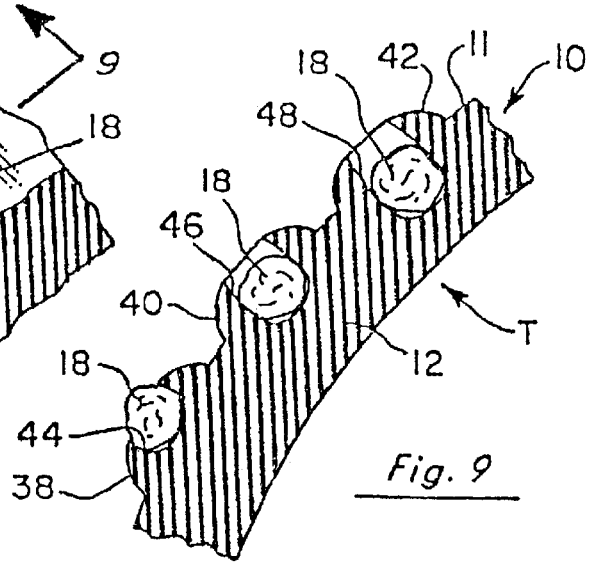
Fig. 9
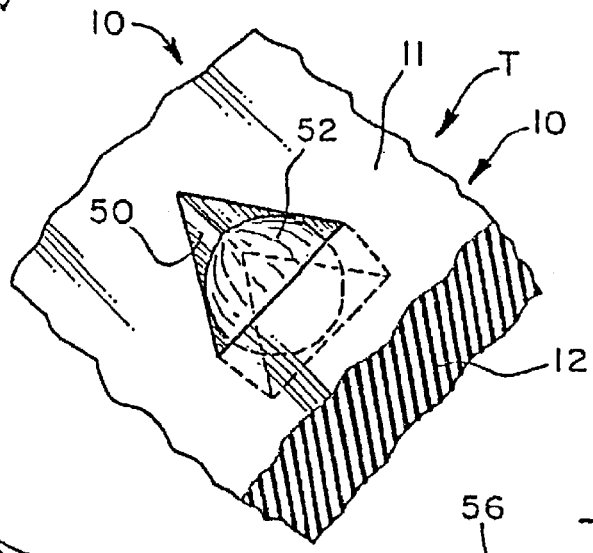
Fig. 10
Fig. 11
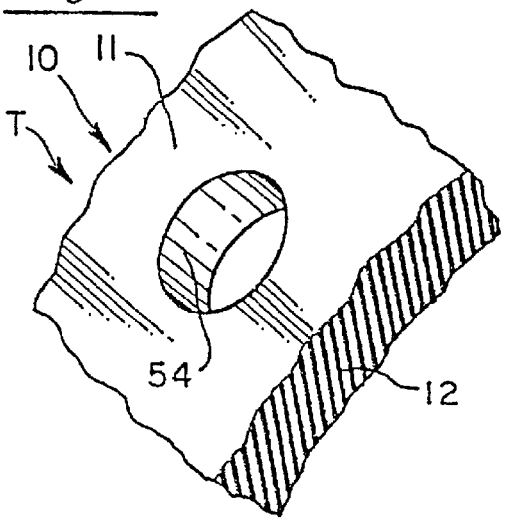
Fig. 12
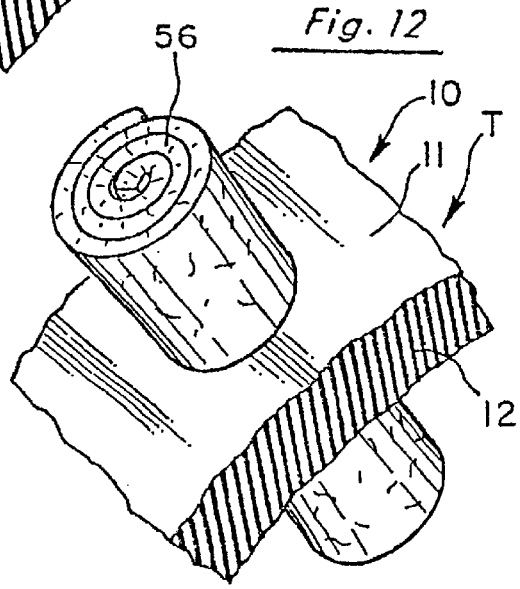

PET TOY PRODUCT WITH INTEGRAL TREATS RECEIVING RECEPTACLES

Matter enclosed in heavy brackets [ ] appears in the original patent but forms no part of this reissue specification; matter printed in italics indicates the additions made by reissue.

TECHNICAL FIELD

This patent application is a continuation of U.S. Ser. No. 08/972,549, filed Nov. 18, 1997, now U.S. Pat. No. 5,947,061, and entitled "Pet Toy Product With Integral Treat Receiving Receptacles" which is a continuation-in-part of U.S. Ser. No. 08/663,447, filed Jun. 13, 1996, now abandoned, and entitled "Pet Toy Product With Integral Treats Receiving Receptacles".

This invention relates to a pet toy product, and more particularly to a pet toy product having recesses and openings for receiving treats.

BACKGROUND ART

Chewable pet toys have been available for many years. Many are impregnated with odors or flavoring materials which are attractive to the animal for which the toy is intended. These toys can be made of various materials, such as rawhide, rubber and plastic. The shortcoming of these products is that after a period of time, the flavor and/or odor becomes less strong and the animal loses interest in the toy. No means is provided for subsequently enhancing the flavor and odor of the toy.

Tay (Des. U.S. Pat. No. 188,179) discloses a pet food holder which has a hollow center for holding food.

Allis (U.S. Pat. No. 1,149,170); Jones (U.S. Pat. No. 260,851); and Edwards (U.S. Pat. Nos. 4,513,014 and 4,557,219) each disclose a pet toy having a flavoring material impregnated therein.

Fisher (U.S. Pat. No. 3,104,648) discloses a pet toy which is odor impregnated.

Markham (U.S. Pat. No. Re. 34,352) discloses a therapeutic pet toy having parallel peripheral grooves in which oral hygiene substances may be placed.

Axlerod (U.S. Pat. No. 3,871,334) and Miller (U.S. Pat. Nos. 3,899,607 and 4,032,665) each disclose pet toys which are both flavor and odor impregnated.

Jungle Talk International sells a product for birds made of wood which has openings in which nuts are firmly fixed. The bird must substantially destroy the wood in order to reach the nuts. Thus, the product cannot be reloaded and reused.

A product known as a "Buster Cube" has an opening in which dry dog food is poured. As a dog knocks it over in playing with it, the food runs out so that the dog can eat it.

Although each of these inventions is suitable for its intended purpose, none provide means on the exterior surface thereof for holding animal treats for keeping the animal interested in the toy.

DISCLOSURE OF THE INVENTION

In accordance with the present invention, a pet toy product is provided for holding, by friction or adhesion, one or more animal treats wherein the toy has a body member having an outer surface with one or more recesses for receiving one or more animal treats. The term "treat" is intended to include any items which are attractive to or are consumed by an animal. The recesses may be of varying depth so that the treats in the deeper recesses are more difficult for the animal to extract than are the treats in the shallower recesses. The recesses may be circular, triangular, irregular, or in the form of a groove or any other suitable configuration. The outer surface of the toy may be raised to accommodate the recesses or the recesses may extend into the surface. Finally, the pet toy may have a recess forming an opening which extends completely through the side wall for receiving a treat. With the structure recited, the pet owner can replenish the treats as often as necessary to maintain the pet's interest in the toy. Different treats can be provided with different nutritional values and tastes. Also, because some treats will be harder for the animal to remove than others, the animal can be kept occupied for several hours before the treats need to be replaced again. The toy may be made of molded rigid or flexible material which can accommodate different types of treats. This construction allows the toy to be used repeatedly by refilling the recesses with more treats.

Additional advantages will become apparent from the description which follows, taken in conjunction what the accompanying drawings.

BRIEF DESCRIPTION OF THE DRAWINGS

FIG. 1 is an illustration of an animal playing with one form of the present invention;

FIG. 2 is a perspective view of a variety of forms of pet toy products embodying the invention;

FIG. 8 is a fragmentary perspective view of a portion of a fourth embodiment of the pet toy product of this invention having a plurality of recesses formed in a plurality of raised areas;

FIG. 9 is a lateral section, taken along line 9—9 of FIG. 8, showing the different depths of the recesses with treats therein;

FIG. 10 is a fragmentary perspective view of a portion of a fifth embodiment of the pet toy product of this invention having a triangular recess;

FIG. 11 is a fragmentary perspective view of a portion of a sixth embodiment of the pet toy product of this invention having a recess extending through the side wall of the pet toy to form an opening for receiving an animal treat; and FIG. 12 is a fragmentary perspective view, similar to FIG. 11, but showing a treat positioned within the opening.

BEST MODE FOR CARRYING OUT THE INVENTION

In accordance with this invention, an animal, such as dog D, is shown in FIG. 1 playing with the pet toy product T of this invention. As best seen in FIG. 2, the pet toy product may have a variety of configurations, such as a ball $T_1$, bone-shaped pet toy product $T_2$, box-shaped pet toy product $T_3$, elongated pet toy product $T_4$, star-shaped pet toy product $T_5$ and annular pet toy product $T_6$. The recesses shown in these pet toy products can be of varying depths, as described below. These configurations are exemplary only and other configurations will be apparent to one of ordinary skill in the art and such other shapes are intended to be included within the scope of this invention.

Figure 3:
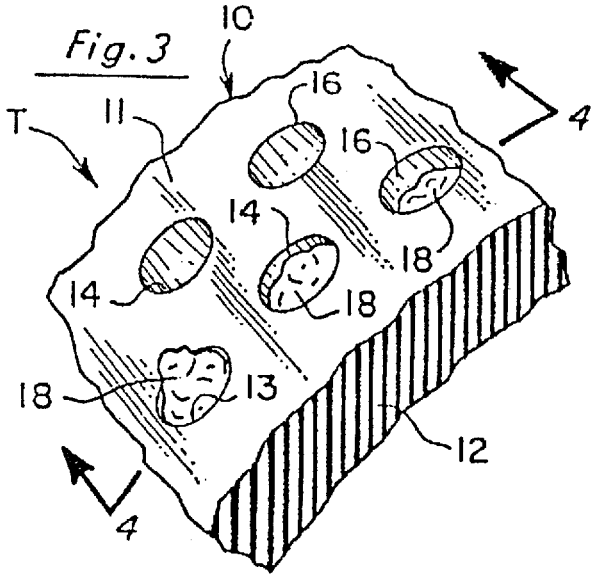
FIG. 3 is a fragmentary perspective view of a portion of a first embodiment of the pet toy product of this invention showing recesses of varying depth containing animal treats.
Figure 4:
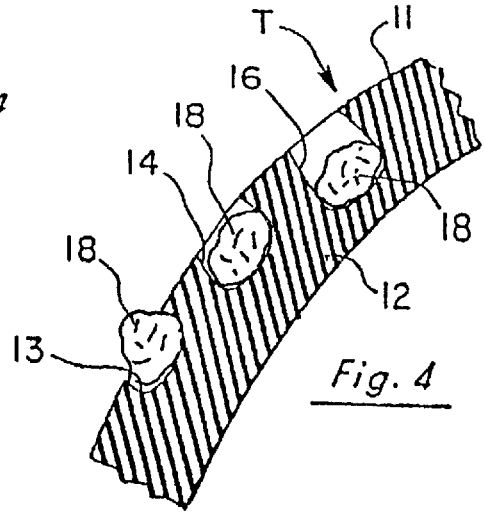
FIG. 4 is a lateral section, taken along line 4—4 of FIG. 3, showing the different depths of the recesses with treats therein.

One embodiment of pet toy product T is shown in FIGS. 3 and 4. The pet toy product T includes a body member 10 with an outer surface 11 which generally defines the shape of the pet toy product T. Body member 10 has a depth defined by side wall 12 which includes a geometrically arranged plurality of depressions or recesses, such as shallow recess 13, medium recess 14 and deep recess 16. Each of the respective recesses has an animal treat 18 which may be inserted therein. The treat can be wedged into a recess in a rigid toy product or can be resiliently gripped by the side surfaces of a flexible product. In other words, the treat is releasably and frictionally held in the recess. An adhesive could also be used to attached the treat within the recess. For example, this treat can be dry pet food. The animal can readily remove the treat 18 from shallow recess 13, but must work harder to recover the treat 18 in medium recess 14. Likewise, the animal must work extra hard to remove treat 18 within deep recess 16.

Figure 5:
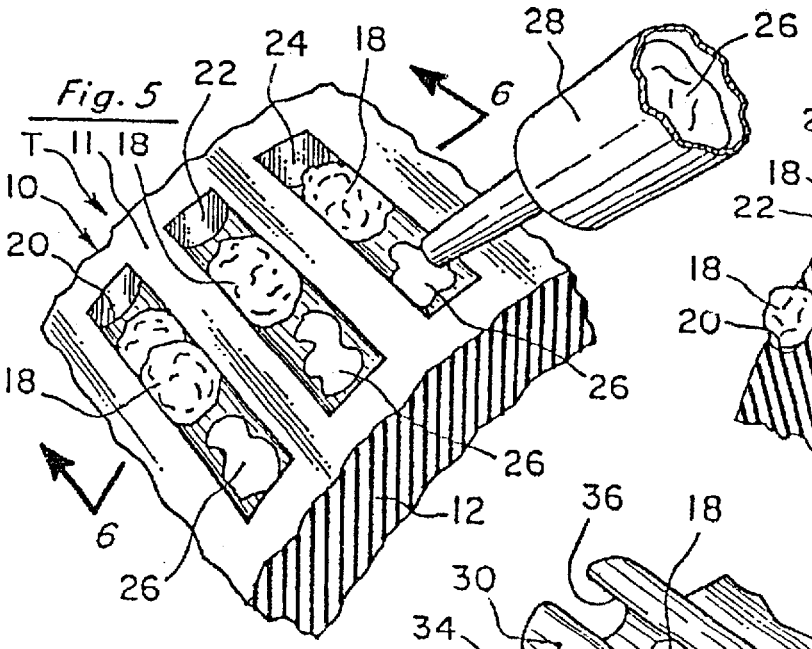
FIG. 5 is a fragmentary perspective view of a portion of a second embodiment of the pet toy product of this invention having longitudinal grooves for receiving animal treats and showing a liquid treat being inserted into the grooves.
Figure 6:
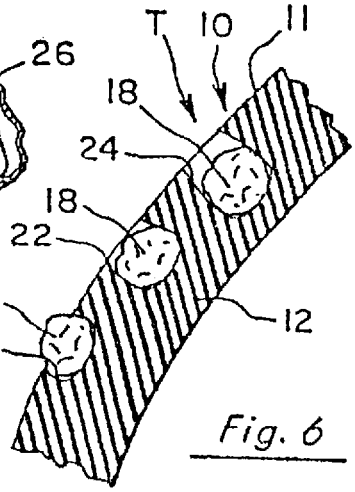
FIG. 6 is a lateral section, taken along line 6—6 of FIG. 5, showing the different depths of the recesses with treats therein.

Another embodiment of pet toy product T is shown in FIGS. 5 and 6. Specifically, side wall 12 is provided with a geometrically arranged plurality of grooves, such as shallow groove 20, medium groove 22 and deep groove 24. A treat 18 can be placed in each of these grooves so that the animal experiences different levels of difficulty in the recovery of the treats from the respective grooves. Additionally, a second liquid or paste treat 26, such as peanut butter or soft cheese, can be placed in the grooves, as from a dispenser 28. This type of treat will be retained by adhesion. This allows the animal to enjoy more than one treat with the same toy.

Figure 7:
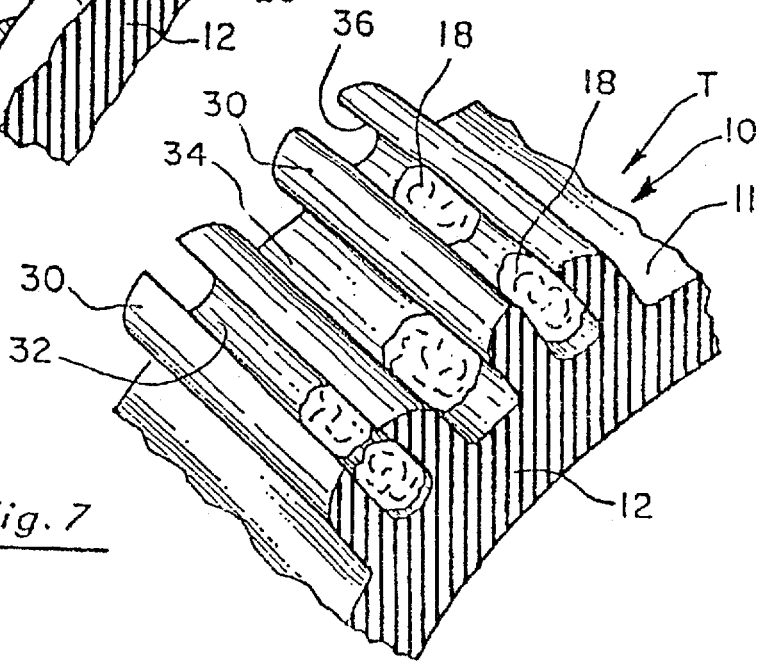
FIG. 7 is a fragmentary perspective view of a portion of a third embodiment of the pet toy product of this invention having longitudinal grooves which are raised above the surface of the toy.

A further embodiment of the invention is shown in FIG. 7 wherein the side wall 12 of pet toy product T is provided with geometrically arranged raised portions 30 which form laterally spaced grooves 32, 34 and 36, respectively. As shown, these grooves can be supplied with one or more treats 18.

A still further embodiment of this invention is shown in FIGS. 8 and 9 wherein the side wall 12 of pet toy product T has a plurality of geometrically arranged raised portions 38, 40 and 42. Raised portion 38 has a shallow recess 44 formed therein; raised portion 40 has a medium recess 46 formed therein; and raised portion 42 has a deep recess 48 formed therein. As shown, treats 18 can be placed in each of these recesses, thus providing different degrees of difficulty for the animal to remove them.

In the embodiment of FIG. 10, side wall 12 of pet toy product T is provided with a triangular recess 50 for receiving a hard treat 52, such as a nut. This form of the invention is particularly attractive for birds, such as parrots, which can use their beaks and/or talons in the space between the corners of the recess and the treat to dislodge the treat.

FIGS. 11 and 12 disclose an embodiment wherein side wall 12 has a recess which extends completely therethrough to form an opening 54 through which a treat 56, such as rawhide can be received.

Although separate embodiments have been illustrated, it is to be understood that the characteristics of one or more embodiments can be incorporated within the same pet toy product. For example, as shown in pet toy products $T_1$ and $T_5$, these toys incorporate a combination of recesses 12, 14, 16, 44, 46, 48 and opening 54.

From the foregoing, the advantages of the present invention are readily apparent. A pet toy having various configurations is provided which has recesses or grooves of varying size and depth for releasably receiving one or more animal treats. Because of the varying depth of the recesses, the animal will experience different degrees of difficulty in removing the treats from the pet toy product. Thus, the pet toy product can keep the animal occupied for extended periods of time. The pet toy product can also be used for birds. The owner can replace the treats by inserting them as needed into the recesses. These treats can take the form of dry pet food, liquid or paste snacks, such as peanut butter or soft cheese. Nuts and vegetables pieces can be provided in the recesses when the pet toy product is used for a bird. In other words, any product to which the animal is attracted can be placed in the recesses. Since the toy is not destroyed by the removal of the treats, the toy can be reloaded with additional treats or foods for reuse.

Although this invention has been described with respect to use with pets, it is understood that it can be used with other animals not usually considered as pets.

This invention has been described in detail with reference to particular embodiments thereof, but it will be understood that various other modifications can be effected within the spirit and scope of this invention.

What is claimed is:

1. A pet toy product which includes one or more edible treats to induce an animal to play with said pet toy product, said pet toy product comprising:

a [molded] body member having [a resilient]*an* outer surface;

a plurality of recesses of varying depths [geometrically] arranged on at least a portion of said outer surface; and edible treats positioned in at least some of said plurality of recesses so that said edible treats in said recesses having deeper depths are more difficult for the animal to extract than are said edible treats in said recesses having shallower depths.

2. A pet toy product, as claimed in claim 1, wherein:

at least one of said plurality of recesses is generally circular shaped.

3. A pet toy product, as claimed in claim 1, wherein:

at least one of said plurality of recesses is non-circular in shape.

4. A pet toy product, as claimed in claim 1, wherein:

said plurality of recesses each have resilient side surfaces; and said edible treats are sized to be wedged into at least some of said plurality of recesses and resiliently held therein.

5. A method of entertaining an animal, said method comprising the steps of:

providing a pet toy having an outer surface with a plurality of recesses of different individual depths formed therein;

inserting a first edible pet treat in at least one of the plurality of recesses so as to be retained within the at least one recess until dislodged by the animal;

inserting a second edible pet treat in at least one other of the plurality of recesses so as to be retained within the at least one other recess until dislodged by the animal; and giving the pet toy to the animal.

6. A method, as claimed in claim 5, wherein said inserting step includes the step of:

frictionally attaching the first and second edible pet treats within the recesses.

7. A method, as claimed in claim 5, wherein said inserting step includes the step of:

attaching the first and second edible pet treats within the recesses by adhesion.

8. A method, as claimed in claim 5, including the further steps of:

reloading at least some of said plurality of recesses with a third edible pet treat after said first and second edible pet treats have been removed from the plurality of recesses by the animal; and returning the pet toy to the animal.

9. A method, as claimed in claim 5, including the further step of:

inserting a plurality of said first or second edible pet treats in at least one of the plurality of recesses.

10. A method, as claimed in claim 5, wherein said plurality of recesses each have resilient side surfaces and said frictionally attaching step includes:

causing the resilient side surfaces to grip the first and second edible pet treats within the recesses.

11. A pet toy product which includes one or more types of edible treats to induce an animal to play with said pet toy product comprising:

a body member having an outer surface;

a plurality of recesses formed on said outer surface, at least some of said plurality of recesses having varying depths; and at least one type of edible treat positioned simultaneously in at least two of said plurality of recesses.

12. A pet toy product, as claimed in claim 11, wherein:

said plurality of recesses secures said at least one type of edible treat by friction.

13. A pet toy product, as claimed in claim 12 wherein:

said plurality of recesses each have resilient side surfaces; and said at least one type of edible treat is sized to be wedged into at least some of said plurality of recesses and resiliently held therein.

14. A pet toy product, as claimed in claim 11, wherein:

said plurality of recesses retain said at least one type of edible treat as by adhesion.

15. A pet toy product, as claimed in claim 11, wherein:

said at least one type of edible treat is two types of edible treats, one each of two types of edible treats being placed within a corresponding plurality of recesses.

16. A pet toy product, as claimed in claim 11, wherein:

said plurality of recesses includes at least one recess formed on said outer surface, and at least one recess extending completely through said body member to form an opening.

17. A pet toy product resiliently holding one or more edible treats to induce an animal to play with said pet toy product, said pet toy product comprising:

a [molded] body member [made of a resilient material] having an outer surface defining the shape of the pet toy product, said body member further having a side wall of a substantially uniform thickness, and a plurality *of* recesses formed in said side wall of varying depths and having resilient side surfaces, wherein the edible treats are wedged into said recesses, said resilient side surfaces of said recesses resiliently holding the edible treats therein.

18. A pet toy product resiliently holding one or more edible treats to induce an animal to play with said pet toy product, said pet toy product comprising:

a [molded] body member [made of a resilient material] having an outer surface defining the shape of the pet toy product, said body member further having a side wall of a substantially uniform thickness, and a plurality *of* recesses formed in said side wall and having resilient side surfaces, wherein the edible treats are wedged into said recesses, said resilient side surfaces of said recesses resiliently holding the edible treats therein.

*19. A pet toy product comprising:*

*a molded and resilient body member having a side wall of substantially uniform thickness and enclosing a substantially spherical shaped and hollow closed interior, a plurality of recesses formed in said side wall, some of said plurality of recesses extending deeper into said side wall than other of said plurality of recesses, said side wall having an outer surface without raised areas formed thereon.*

*20. A pet toy product, as claimed in claim 19, wherein:*

*said plurality of recesses include resilient walls adapted to frictionally and releasably secure a pet treat therein.*

*21. A pet toy product, as claimed in claim 19, wherein:*

*at least some of said recesses extend all the way through said side wall, and remaining recesses of said plurality of recesses extend partially through said side wall.*

*22. A pet toy product comprising:*

*a body member having a side wall of substantially uniform thickness and enclosing a substantially hollow closed interior, a plurality of recesses formed in said side wall, said recesses including a plurality of grooves wherein at least two of said plurality of grooves share a common groove wall located therebetween, said side wall having an outer surface without raised areas formed thereon; and*

*at least some of said recesses extend all the way through said side wall, and remaining recesses of said plurality of recesses extend partially through said side wall.*

*23. A pet toy product, as claimed in claim 22, wherein:*

*said plurality of recesses include resilient walls adapted to frictionally and releasably secure a pet treat therein.*

*24. A pet toy product comprising:*

*a body member having a sidewall of substantially uniform thickness and enclosing a substantially hollow closed interior, said body member having an outer surface with a plurality of raised areas formed thereon, at least one of said raised areas having a recess formed thereon; and*

*said plurality of raised areas include corresponding recesses, at least some of said recesses extending all the way through said side wall, and remaining recesses extending partially through said side wall.*

*25. A pet toy product, as claimed in claim 24, wherein:*

*said recess includes resilient walls adapted to frictionally and releasably secure a pet treat therein.*

* * * * *